Nov. 8, 1938.    O. RUEHMANN    2,135,772
HOSE SUPPORT
Filed March 8, 1937
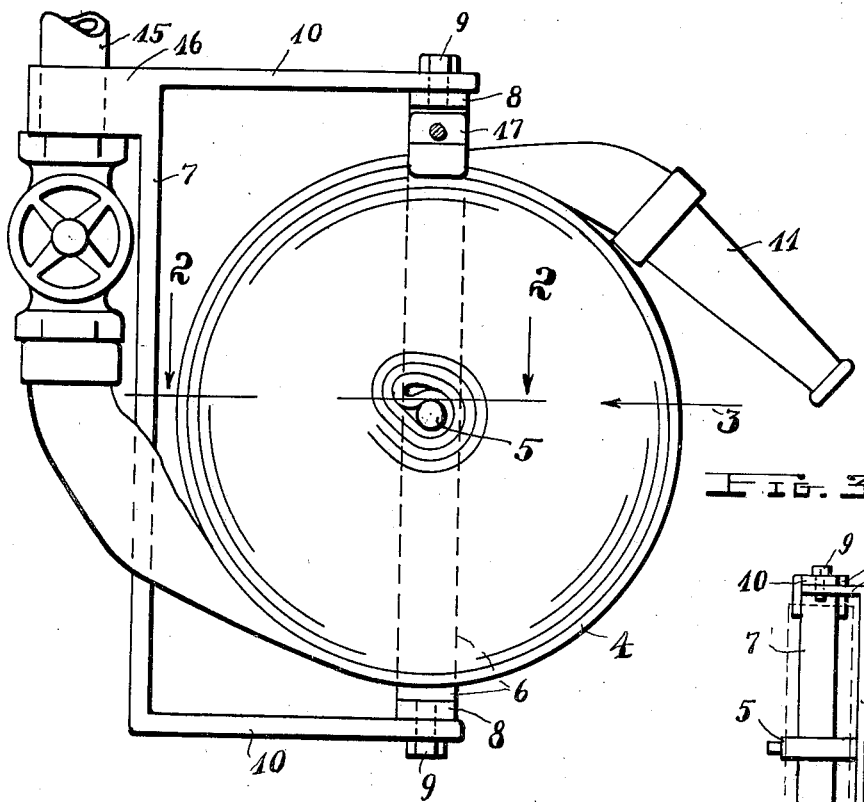
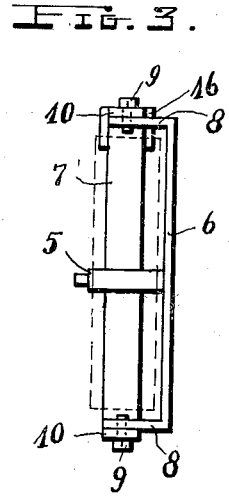
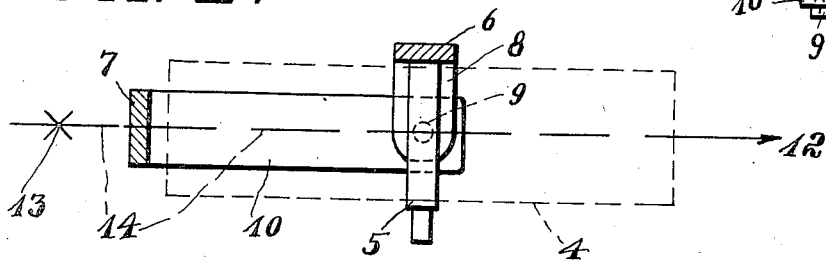
INVENTOR:
OTTO RUEHMANN,
By: his Atty.

Patented Nov. 8, 1938

2,135,772

UNITED STATES PATENT OFFICE 2,135,772

HOSE SUPPORT

Otto Ruehmann, Los Angeles, Calif.

Application March 8, 1937, Serial No. 129,655

3 Claims. (Cl. 242—86)

This invention relates to devices used for supporting hoses when in inoperative position in places such as on walls, and, particularly, for mounting a firehose support such as disclosed in my Patent 2,045,966, issued June 30, 1936.

One of the objects of this invention is to provide a device that will act self-aligning in the direction in which a hose may be drawn from its support.

Another object is to provide a device that may be arranged on different sides of the supplying water connection in conjunction with which this device is to be used.

Another object is to provide a device so designed that it may be applied to a water standard with which the device is to cooperate.

Other objects will appear from the following description and appended claims as well as from the accompanying drawing, in which—

Fig. 1 is a side elevation of a hose support applied to a water standard according to this invention.

Fig. 2 is a section on line 2—2 of Fig. 1.

Fig. 3 is an end view of the support as seen in the direction of the arrow 3 in Fig. 1.

As explained in the specification of the previously issued Patent 2,045,966, filed Oct. 20, 1934, under Serial No. 749,212, the hose 4 is wound in a doubled-up condition, mounted on the pin 5, which in turn is mounted on the support 6.

However, instead of mounting the support 6 directly to a wall or similar place, as explained in my previous application, the support 6 of this case is mounted swingably within a bracket 7.

The support itself, in this case, is, of course, accordingly slightly modified, being provided with shanks 8, making the support of U-form, the shanks extending to points to have pivot means at about the middle of the flattened out and wound hose to be supported pivotally about any suitable means, such as bolts indicated at 9.

The whole arrangement, with the pivot about the point or axis passing through the bolts 9, nevertheless, is such that the hose 4 becomes located centrally when mounted on the pin 5, in such a manner that a taking hold of the hose-nozzle 11 for the sake of removing the hose from its support, by applying a pulling force, such as in the direction of the arrow 12 in Fig. 2, will act in alignment of the central axis through the bracket and through the center 13 of the supporting water standard, such alignment being indicated by the dotted lines 14.

This is to say that, regardless of the direction in which a person may run with the hose-nozzle 11, a pulling of the hose will always result in an action along the arrow 12 so as to align the hose and the bracket about the pivot 9 and about the center 13 of the supporting water standard 15.

Having made the shanks 8 of such a length as to extend from the backing member of the support 6 to bring the pivot 9 to the center of a rolled-up hose, indicated in dotted lines at 4 in Fig. 2, in alignment with the arrow 12 and lines 14, it will be understood that the support 6 may be turned around so that the pin 5 may point to either side of the main bracket 7 with the shanks 10.

These features allow an arrangement of the doubly pivoted brackets, bracket 7 with its pivot around the point 13, and the support 6 with its pivot 9, to bring the whole structure with a supported hose to the left or right of a water standard.

Such an arrangement is of greatest importance, with due consideration to the often limited space in buildings for such devices, to assure a proper alignment and thereby a proper functioning in the manner set forth, no matter where or how the device has been mounted, to always facilitate a proper, ready, and useful removal of a hose from the support.

The shanks 10 of the bracket 7 are therefore to allow and facilitate a swinging about of the support 6 and a supported hose, the shanks 10 having the pivot means accordingly at such points to properly cooperate with the pivots of the support 6.

The combined members of the brackets 7 are therefore naturally also of somewhat of a U-form though, of course, this does not necessarily have to be sharp-cornered, inasmuch as it involves the rather round contours of the wound-up hose, and more rounding corners would easily satisfy the requirements for the shape bracket to readily suit for the proper supporting of the hose and still allow such turning about as set forth.

The bracket is provided with a lug 16 designed to snugly, but turnably, fit on the water standard 15 in the manner illustrated in Fig. 1.

A clamp 17 serves to hold the hose 4 in place on the device and still allows a ready removal by the fact that it only requires a short jerk, or a fraction of a turn when sufficient hose will have been removed from the roll that the whole hose may be removed endwise from the pin 5, though, of course, a removal may also be accomplished by a continued pull on the nozzle and therewith a continued unrolling of the hose from the pin, without any attention to the clamping device 17.

A replacing of the hose to the pin and therewith to the rack is easily accomplished by winding a folded-up hose around the pin 5 until the rolled-up hose becomes securely clamped in position, the last part of the last turn eventually being slightly tight.

Having thus described my invention, I claim:—

1. In a hose support, a bracket of U-shaped form, concentric pivot means in the shanks of the U-shaped bracket, an eye member on the bracket with an axis parallel to the concentric pivot means, a hose-holding frame also of U-shaped form pivotally mounted in the bracket, concentric pivot means in the shanks of the hose-holding frame adapted to align with the first-named pivot means, and a hose-supporting pin on the base of the U-shaped frame with an axis at right angles to the axis of the pivot-means.

2. In a hose support, a bracket of U-shaped form, concentric pivot means in the shanks of the U-shaped bracket, an eye member on the bracket with an axis parallel to the concentric pivot means, a hose-holding frame of U-shaped form pivotally mounted in the bracket, concentric pivot means in the shanks of the hose-holding frame with an axis substantially spaced from the base of the U-shaped frame a distance equal to half the width of a hose to be used in the frame and the axis of the pivot-means of the frame adapted to align with the axis of the first-named pivot-means, and a hose-supporting pin on the base of the U-shaped frame with an axis at right angles to the pivot means and therebetween in alignment.

3. In a hose support, a bracket of U-shaped form, concentric pivot means in the shanks of the bracket, an eye member on the bracket with an axis parallel to the axis of the pivot means, a hose-holding frame of U-shaped form pivotally mounted in the bracket, concentric pivot means in the shanks of the frame aligning with the first-named pivot-means, a hose-supporting pin on the base of the frame with an axis at right angles to the pivot means of the frame, and clamping means on the frame in a position to frictionally engage the periphery of a hose disposed on the pin.

OTTO RUEHMANN.